United States Patent Office.

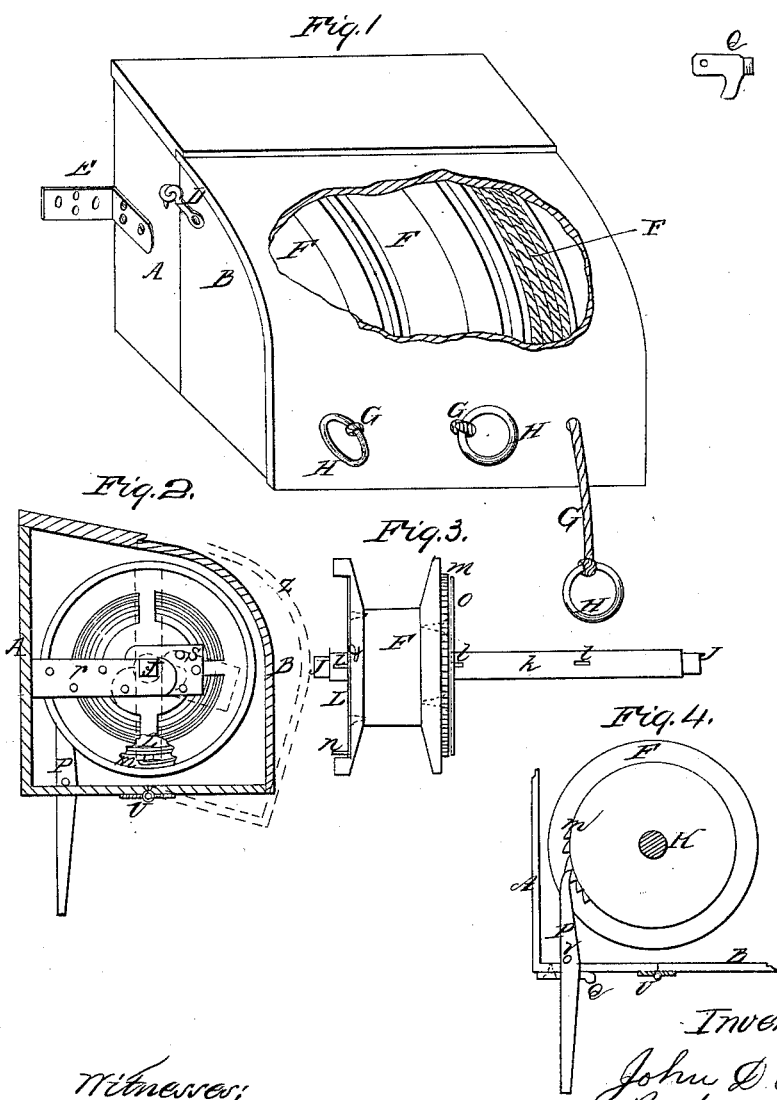

JOHN D. STARRITT, OF CHICAGO, ILLINOIS.

Letters Patent No. 67,459, dated August 6, 1867.

---

IMPROVED CLOTHES-LINE REEL.

---

*The Schedule referred to in these Letters Patent and making part of the same.*

---

TO ALL WHOM IT MAY CONCERN:

Be it known that I, JOHN D. STARRITT, of Chicago, in the county of Cook, and State of Illinois, have invented an apparatus for operating Clothes-Lines; and I do hereby declare that the following is a full, clear, and exact description of the construction and operation of the same, reference being had to the annexed drawings, making a part of this description, in which—

Figure 1 is a perspective representation of my invention.

Figure 2, an end elevation, with the end of the box removed to show the inside arrangement.

Figure 3, a view of the shaft and one of the spools detached from the box.

Figure 4, an end view of one of the spools, showing the ratchet, pawl, and catch.

The nature of my invention consists in the use of a two-part box, one part of which is arranged so as to be fastened to a wall and the other part to open and shut, the object being to provide a substantial case for supporting and protecting spools, cords, and other necessary inside devices, which are so constructed that said cords can be run out through openings in the box any desired distance, and then be securely locked at the spool and by means of a ratchet, pawl, and catch. And further, in the use of double lock-plates at the ends of the box for the purpose of holding the spool-shaft in position, and in arranging a plate for supporting the ends of the spools, so that it will answer the purpose of a boxing for the spool-shaft and a catch for securing the outer end of the coil-springs used for winding up the cords.

By this arrangement, a very convenient device is provided for running out and taking in clothes-lines in a manner so as to prevent them from being drawn through coal-dust, soot, and other filthy matter in yards, lawns, &c., and also as a protection against weather, thus avoiding many of the inconveniences which now have to be endured.

In order to give a correct understanding of my invention, I have marked corresponding parts with similar letters, and will now give a detailed description.

A B, figs. 1 and 2, represent a two-part box, the former being arranged, by means of straps E on both sides, so as to be secured to the wall of a house or other convenient place, and the latter, B, is hung to the former, A, by means of hinges U, figs. 2 and 4, so as to open and shut, as seen by dotted lines Z, at fig. 2. Two catches D, one on each side of box A B, are used to clamp the part B firmly to A and prevent water from entering. The object of making the box in two parts is for the convenience of adjusting the inside arrangements and repairing them when out of order, and, as the part B is curved downward, water will readily pass off. A shaft, K, is made for spools F to revolve upon, and is removable by means of locks $r$ and $s$, the first being attached to the end of box A and the last to B, by which means the said shaft K can be lifted out of its notch in lock $r$, when part B has been opened, as seen by dotted lines Z above mentioned, at which time the lock $s$, attached to B, will be moved out of the way. This arrangement is very simple, and locks the square ends J of shaft K, when part B is shut, and allows the same to be readily taken out when said part B is open. Spools F are made of wood, and to revolve on shaft K, similar to loose pulleys, and have ratchet-wheels $m$, figs. 3 and 4, attached to them for the purpose of locking said spools when lines G have been run out the required length. A plate, L, shown at figs. 2 and 3, is attached to the end of each pulley F, as seen more clearly at section $x$, (one end of spool, at fig. 3,) and used as a boxing for shaft K, support for the spools F, and also a means of attachment for coil-springs $t$, by means of a nib, $n$, the other end of said spring being attached to shaft K by being put through mortise I, fig 3. A common washer, O, same figure, is put on said shaft for the purpose of keeping spools F from wearing each other. A pawl, P, is secured to part A for each spool, to lock them when a suitable length of cord has been run out; and to prevent the pawl P from getting loose, a catch, Q, is arranged to hook around said pawl and hold it fast.

The operation is very simple, consisting in attaching A to the desired place, and unlocking catch Q, when running out cord G, and locking it when a suitable length has been used.

What I claim, and desire to secure by Letters Patent, is—

1. The combination of the two-part box A B, with spools F, shaft K, and cord G, substantially as set forth.

2. The combination of locks $r$ $s$, shaft K, and two-part box A B, arranged to hold said shaft K, when box A B is shut, and loosen it when open, as set forth.

3. The ratchet-wheel $m$, in combination with pawl P, spools F, and catch, as described.

J. D. STARRITT.

Witnesses:
GEO. L. CHAPIN,
A. HAYWARD.